US012169898B1

(12) United States Patent
Mang et al.

(10) Patent No.: US 12,169,898 B1
(45) Date of Patent: Dec. 17, 2024

(54) RESOURCE ALLOCATION FOR MESH SHADER OUTPUTS

(71) Applicant: Apple Inc., Cupertino, CA (US)

(72) Inventors: Michael A. Mang, Oviedo, FL (US); Jason D. Carroll, Oviedo, FL (US); Jingfei Kong, Orlando, FL (US); Ralph C. Taylor, Deland, FL (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 18/054,581

(22) Filed: Nov. 11, 2022

Related U.S. Application Data

(60) Provisional application No. 63/376,671, filed on Sep. 22, 2022.

(51) Int. Cl.
*G06T 17/20* (2006.01)
*G06T 15/00* (2011.01)
*G06T 15/20* (2011.01)
*G06T 15/40* (2011.01)

(52) U.S. Cl.
CPC ............ *G06T 17/20* (2013.01); *G06T 15/005* (2013.01); *G06T 15/20* (2013.01); *G06T 15/40* (2013.01)

(58) Field of Classification Search
CPC ....... G06T 17/20; G06T 15/005; G06T 15/20; G06T 15/80; G06T 17/005; G06T 17/10; G06T 17/205; G06T 15/40; G06T 15/00; G06T 17/00
See application file for complete search history.

(56) References Cited

U.S. PATENT DOCUMENTS

| | | | | |
|---|---|---|---|---|
| 10,963,985 | B2 * | 3/2021 | Doyle | G06T 1/60 |
| 10,991,127 | B2 * | 4/2021 | Nevraev | G06T 15/80 |
| 11,145,105 | B2 * | 10/2021 | Surti | G06T 1/60 |
| 2019/0236828 | A1 | 8/2019 | Hakura | |
| 2020/0051286 | A1 * | 2/2020 | Nevraev | G06T 17/205 |
| 2020/0410631 | A1 * | 12/2020 | Doyle | G06T 1/20 |

(Continued)

OTHER PUBLICATIONS

Oliver Eriksson, Smooth Particle Ribbons Through Hardware Accelerated Tessellation, Degree Programme in Computer Science and Engineering, Computer Graphics Forum, Apr. 19, 2022, 24 pages, Stockholm, Sweden.

(Continued)

*Primary Examiner* — Vijay Shankar
(74) *Attorney, Agent, or Firm* — Kowert, Hood, Munyon, Rankin & Goetzel, P.C.; Michael B. Davis; Daniel M. Munyon

(57) ABSTRACT

Techniques are disclosed relating to object and mesh shaders executed by a graphics processor. In some embodiments, a device includes buffer circuitry and shader circuitry configured to execute graphics programs. Control circuitry may: generate object shader work and mesh shader work for the shader circuitry, receive output information generated by a mesh shader that indicates a number of vertices and primitives to be output by the mesh shader, allocate, based on the output information and after execution of at least a portion of the mesh shader, a region of the buffer circuitry for storage of the vertices to be output by the mesh shader, and store the vertices output by the mesh shader in the allocated region. Disclosed techniques may advantageously provide efficient use of limited buffer resources.

17 Claims, 14 Drawing Sheets

(56) References Cited

U.S. PATENT DOCUMENTS

2023/0101978 A1* 3/2023 Neff ...................... G06T 17/10
 345/418

OTHER PUBLICATIONS

J. Unterguggenberger et al., Conservative Meshlet Bounds for Robust Culling of Skinned Meshes, TU Wien, Institute of Visual Computing & Human-Centered Technology, Published by John Wiley & Sons Ltd., vol. 40, No. 7, 2021, 13 pages.

* cited by examiner

*Example mesh shader output 900*

Primitive indices (e.g., triangle list, line list, or point list)

<u>Per primitive:</u>
Viewport ID
Layer ID
Primitive cull

<u>Per vertex:</u>
Position X,Y,Z,W
Linear/NPC/Flat
Point size
Viewport ID / Layer ID
ClipCull distances

RESOURCE ALLOCATION FOR MESH SHADER OUTPUTS

CROSS-REFERENCE TO RELATED APPLICATIONS

This application is related to U.S. application Ser. No. 18/054,612, filed Nov. 11, 2022.

The present application claims priority to U.S. Provisional Application No. 63/376,671, filed Sep. 22, 2022, the disclosure of which is incorporated by reference herein in its entirety.

BACKGROUND

Technical Field

This disclosure relates generally to computer graphics processors and more particularly to mesh shader execution techniques.

Description of the Related Art

Graphics processing tasks typically include geometry work, e.g., which is typically performed on vertex information for primitives (e.g., triangles) in a graphics scene. After geometry processing, rasterization may generate pixel data for pixel shaders that generate pixel attributes for a frame of graphics data.

Geometry processing may utilize both fixed-function circuitry and shaders (e.g., vertex shaders). Some processors support mesh techniques, in addition to or in place of vertex shaders. In this context, object shaders (which may also be referred to as task shaders) may generate a number of child mesh shaders that are operated on by mesh shaders to generate meshlets (for consumption by fragment processing). For example, a non-mesh graphics pipeline may include the following stages: vertex attribute fetch, vertex shader, tessellation, geometry shader, rasterization, and fragment shader stages. In contrast, a mesh-based graphics pipeline may include the following stages: task shader, mesh generation, mesh shader, and rasterization, which may provide more flexibility in vertex and geometry processing tasks. A given meshlet represents a number of vertices and primitives, and may have a maximum size for a given architecture.

DETAILED DESCRIPTION

As discussed above, geometry tasks for a graphics processor may utilize object shaders and mesh shaders. Object shaders may generate a number of child mesh shaders. Mesh shaders may output meshlets with primitive and vertex data to a buffer for further processing (e.g., for culling, clipping, and eventually rasterization).

In some embodiments, vertex control circuitry is configured to allocate buffer space for mesh shader output data later than traditional techniques, e.g., based on information generated during execution of the mesh shader itself. The mesh shader may include user code to generate this information or code may be inserted by a graphics driver, for example. This may allow efficient allocation of buffer space once the actual output data size is known, which may allow for a smaller buffer in terms of circuit area and may reduce conflicts for buffer resources.

In some embodiments, vertex control circuitry may provide partial allocation of buffer space requested by a mesh shader. The partial allocations may be signaled using fences, for example, and different fences may correspond to different partial allocation amounts. Further, different fences may have different meanings based on the total allocation requested.

In some embodiments, vertex control circuitry may launch mesh shaders based on various status information, e.g., to avoid shader processors being blocked waiting for buffer space, to avoid starvation of a primitive processing pipeline that operates on mesh shader outputs, to reduce cache spills, or some combination thereof.

In some embodiments, the primitive processing pipeline is configured to perform viewport transforms. In some embodiments, scoreboard circuitry is configured to initiate viewport transformation on mesh vertices differently depending on whether primitives and vertices have a per-primitive, per-vertex, or shared viewport identifier (ID). In some embodiments, the device includes scratch memory circuitry configured to store viewport transform outputs and space in the scratch memory is allocated (e.g., to provide an entry per vertex) shortly before a viewport transform runs.

In various embodiments, disclosed techniques may advantageously improve performance, reduce power consumption, reduce chip area, or some combination thereof.

Graphics Processing Overview

Figure 1A:
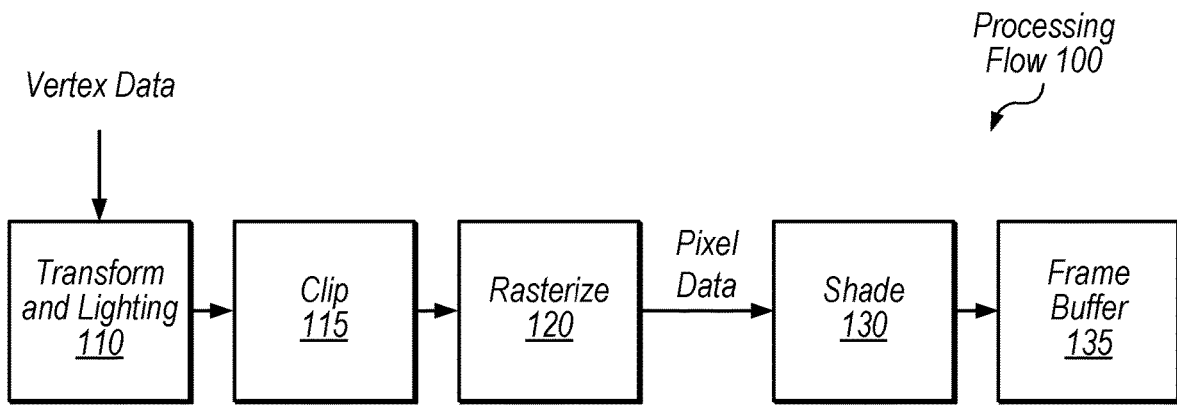
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
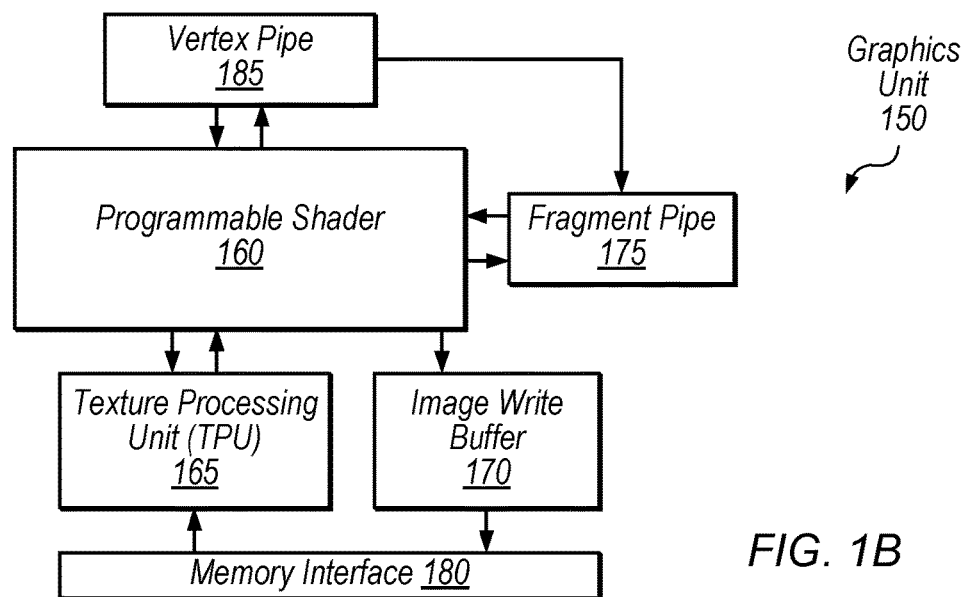
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Object Shaders and Mesh Shaders

Figure 2:
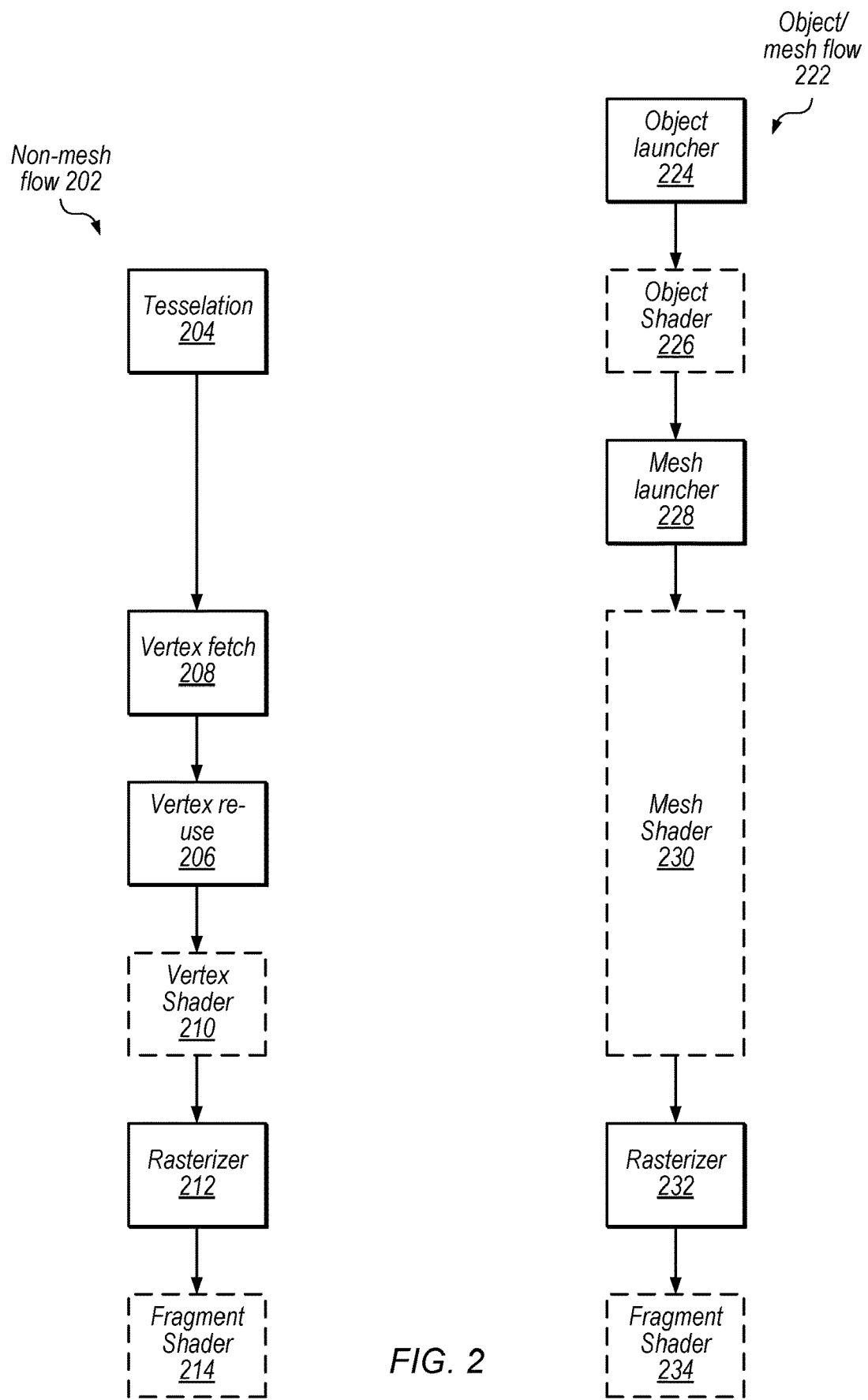
FIG. 2 is a diagram comparing a non-mesh graphics flow with an example object/mesh shader flow, according to some embodiments.

FIG. 2 is a diagram comparing examples processing flows for non-mesh vertex shader techniques and object/mesh shader techniques, according to some embodiments. Note that a given processor may support both approaches. In this example, blocks shown using dashed lines may be performed by a shader while other blocks may be performed by fixed-function circuitry. The division between shaders and fixed-function hardware may vary in different embodiments, however.

Non-mesh flow 202, in the illustrated embodiment, includes tessellation 204, vertex fetch 208, vertex re-use 206, vertex shader 210, rasterizer 212, and fragment shader 214. Object/mesh flow 222, in the illustrated example, includes object launcher 224, object shader 226, mesh launcher 228, mesh shader 230, rasterizer 232, and fragment shader 234. Generally, operations such as tessellation, vertex operations, fragment shading, etc. are well-understood graphics techniques.

As shown, the object shader 226 may perform operations performed by tessellation circuitry 204 in non-mesh implementations. The mesh shader 230 may perform operations performed by vertex fetch circuitry 208, vertex re-use circuitry 206, and a vertex shader 210, in non-mesh implementations. Object launcher circuitry 224 and mesh launcher circuitry 228 may be configured to launch object and mesh shaders respectively.

Speaking generally, object and mesh shaders may be similar to compute kernels in terms of capability. For example, all three types of shaders may operate in threadgroups sized in multiple dimensions (e.g., X, Y, and Z) with a limit on the number of total threads per threadgroup. The threads in a threadgroup may share data through local shared memory. A DispatchMesh rendering primitive may be utilized to launch N object shader threadgroups. A given object shader threadgroup may output a payload of data and a number of child mesh threadgroups (the child count may also be in X, Y, and Z dimensions). Each mesh threadgroup may launch and produce an output "meshlet" to be consumed by rasterizer circuitry.

In various embodiments, utilizing object and mesh shader techniques may advantageously improve performance and provide flexibility and programmability.

Example Allocation Techniques for Mesh Shader Output Data

As discussed above, meshlets output by mesh shaders may eventually be rasterized. Various operations may be performed before rasterization, however, such as viewport transform, amplification, culling, and clipping. Therefore, mesh shader outputs may be stored in a buffer. Because mesh shaders may output meshlets of different sizes based on vertex and primitive count, implementations that allocate buffer space prior to mesh shader execution may be inefficient (e.g., such implementations may allocate the maximum buffer output size to a given mesh shader). In contrast, in some embodiments, control circuitry is configured to allocate buffer space after a mesh shader has at least partially executed, in order to allocate only the buffer space needed for the mesh shader's output based on vertex and primitive count.

Figure 3:
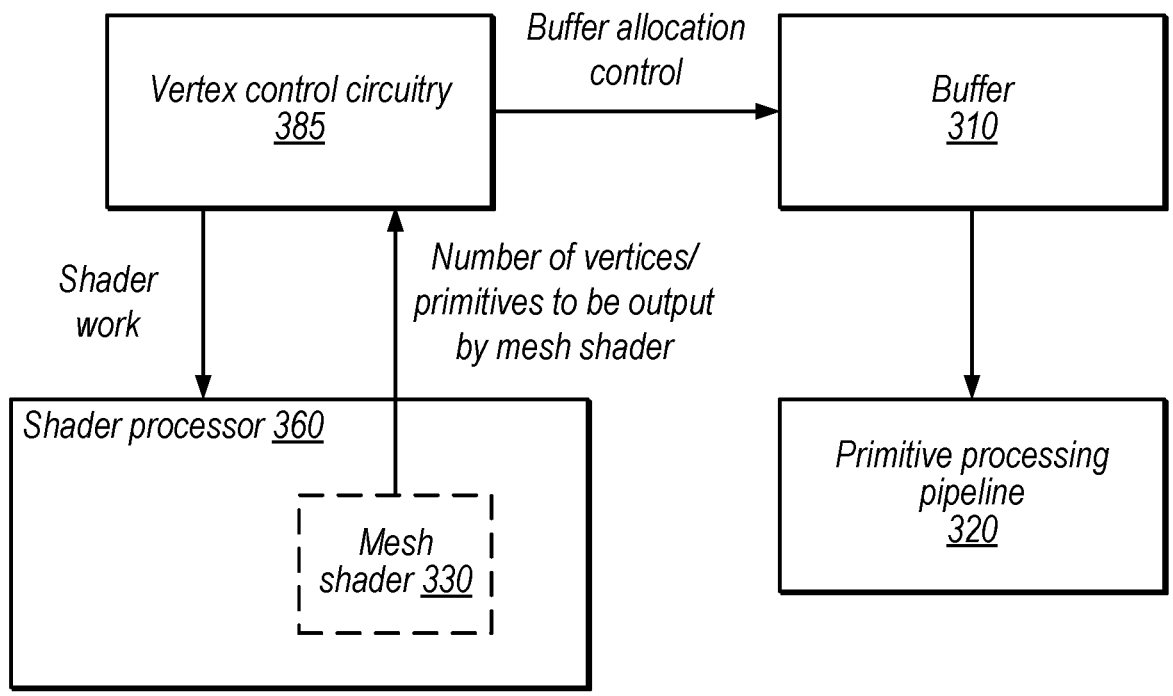
FIG. 3 is a block diagram illustrating example circuitry configured to allocate buffer space for a mesh shader after it has already begun execution, according to some embodiments.

FIG. 3 is a block diagram illustrating example circuitry configured to allocate buffer space for a mesh shader after it has already begun execution, according to some embodiments. In the illustrated embodiment, graphics unit 150 includes buffer circuitry 310, primitive processing pipeline 320, shader processor 360, and vertex control circuitry 385.

Shader processor 360, in the illustrated embodiment, is configured to execute mesh shader 330. As shown, shader processor 360 may receive shader work from vertex control circuitry 385, which may include mesh shaders and object shaders. In some embodiments, a geometry and tiling pipeline performs certain fixed-function geometry tasks and launches shader work.

Mesh shader 330 is configured to generate meshlet output information for storage in buffer 310. In some embodiments, mesh shader 330 includes user code, which may include an instruction that indicates the number of vertices, primitives, or both to be output by the mesh shader. The instruction may be defined by an application programming interface (API) supported by shader processor 360. In other embodiments, a graphics driver may insert such an instruction. In some embodiments, mesh shader 330 outputs to a mesh shader memory space (e.g., in a unified memory architecture) as an intermediate step and runs a copy shader to move the outputs to allocated storage in buffer 310. Therefore, mesh shader 330 may request an allocation in buffer 310 that is sized for the output data it will generate and copy the outputs to buffer 310 once the request is granted.

Buffer 310 may include multiple banks and multiple interfaces for access by different writers and readers. In some embodiments, graphics unit 150 includes a buffer content RAM to store allocation information and meshlet terms for data stored in buffer 310 (e.g., for N recent tasks of M SIMD groups).

Mesh shader output information may include position, color, texture, cull distance, point size, etc. for vertices of various primitives. An example data structure for mesh shader output is discussed in detail below with reference to FIG. 9.

Primitive processing pipeline 320, is configured to consume data from buffer 310, e.g., for processing for consumption by a fragment shader. A detailed example embodiment of primitive processing pipeline 320 is discussed below with reference to FIG. 6. For example, primitive processing pipeline 320 may control mesh shader execution, perform viewport transforms, perform vertex amplification, control vertex indices, perform culling, etc.

Vertex control circuitry 385, in some embodiments, is configured to receive the information indicating the number of vertices/primitives to be output by the mesh shader and control buffer allocation in buffer 310. Vertex control circuitry 385 may inform shader processor 360 when the allocation is complete. Vertex control circuitry 385 may multiply a data size per vertex by the number of vertices to be output to determine the allocation size.

Disclosed techniques may advantageously reduce conflicts for space in buffer 310, which may improve performance while allowing buffer 310 to remain small, in terms of circuit area, relative to techniques with earlier allocation or that do not support partial allocation.

Note that a small buffer 310 may result in challenges when allocating for mesh shaders with large outputs. Therefore, vertex control circuitry 385 may allow partial allocation and a given mesh shader may write a portion of its results to the partial allocation space prior to its entire allocating being available.

Figure 4:
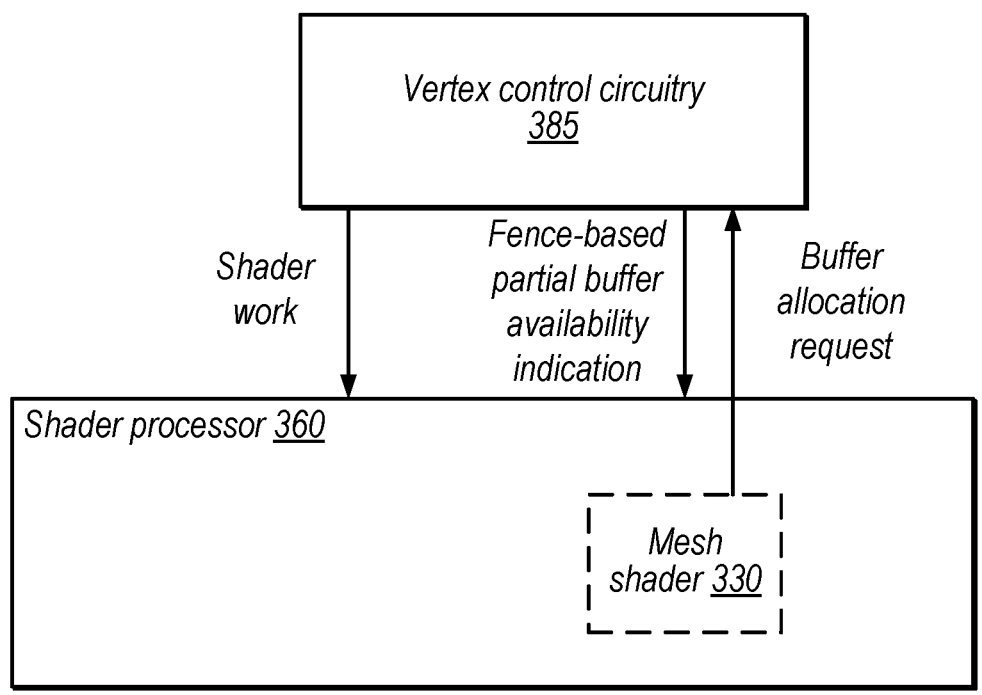
FIG. 4 is a block diagram illustrating example circuitry configured to partially allocate requested buffer space for a mesh shader, according to some embodiments.

FIG. 4 is a block diagram illustrating example circuitry configured to partially allocate requested buffer space for a mesh shader, according to some embodiments. In the illustrated example, vertex control circuitry is configured to provide fence-based partial buffer availability indication to shader processor 360 in response to buffer allocation requests.

The fence mechanism may stall a thread or put it to sleep until a fence is satisfied. Many shader processors support a number of fences to enforce ordering, e.g., in weakly-ordered memory architectures. A wait-on-fence operation may be inserted and execution is not allowed to proceed past the fence until the fence is satisfied (e.g., based on execution of younger instructions completing, multiple threads reaching the fence, etc.).

Vertex control circuitry 385 may utilize those fences to map to different sub-allocation sizes. The mapping of fence completions to allocation sizes may be fixed or may be negotiated, e.g., providing the mapping to mesh shader 330 during execution. Further, the meanings of the different fences may vary based on the size of the buffer allocation request (e.g., one fence may indicate that two units in buffer 310 are available when eight units are requested but may indicate that four units are available when sixteen units are requested). Note that the request may correspond to the number of vertices/primitives to be output by the mesh shader in FIG. 3.

While fences are discussed for purposes of explanation, other signaling to indicate partial buffer availability are contemplated. Fence-based techniques may be particularly efficient in processors that already support multiple fences, however, because they may not require new signaling.

Disclosed techniques may advantageously allow mesh shaders to make forward progress and write partial results even when their full buffer allocation cannot yet be provided.

Example Mesh Shader Launch Control Techniques

Using a limited-size buffer for vertex data may introduce various challenges in workload distribution. For example, a shader 360 may be blocked when too many shaders are competing for buffer allocation but primitive processing pipeline 320 may be idle if buffer data is not available for processing.

Figure 5:
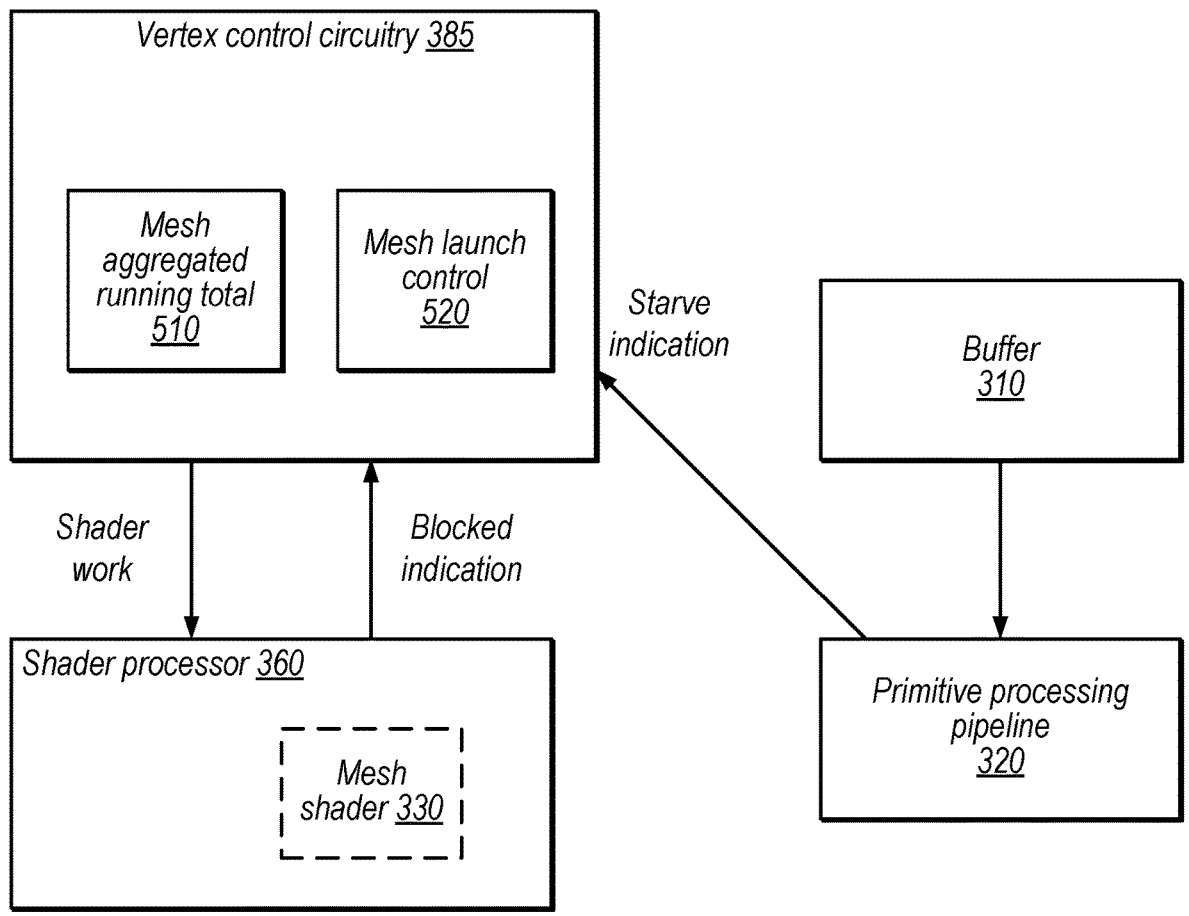
FIG. 5 is a block diagram illustrating example circuitry configured to distribute mesh shaders based on shader and primitive processing status, according to some embodiments.

FIG. 5 is a block diagram illustrating example circuitry configured to distribute mesh shaders based on shader and primitive processing status, according to some embodiments.

Vertex control circuitry 385, in the illustrated embodiment, includes mesh launch control circuitry 520 and circuitry 510 configured to maintain a mesh aggregated running total. Generally, vertex control circuitry 385 may launch mesh shaders to multiple different shader processors according to a distribution algorithm (typically attempting to distribute evenly such that various shader processors in a GPU stay busy).

Circuitry 510, in the illustrated embodiment, is configured to track the intermediate and output data size of mesh shaders that are currently active (e.g., that have launched and not yet written their results).

Meshlet launch control may impose a threshold on the output data size of active mesh shaders based on various input factors, discussed in detail below. Therefore, when the running total tracked by circuitry 510 meets the threshold, mesh launch control 520 may stop sending mesh shader work to a given shader processor 360.

In the illustrated embodiment, vertex control circuitry 385 receives a blocked indication from shader processor 360 and a starve indication from primitive processing pipeline 320. Vertex control circuitry 385 may adjust distribution of shader work based on these inputs. As one example, vertex control circuitry 385 may dynamically raise the threshold on the output data size of mesh shaders active on shader processor 360 when primitive processing pipeline is starved or reduce the threshold when shader processor 360 is blocked by lack of space in buffer 310.

Primitive processing pipeline 320 may assert the starve indication when it does not have data available to process in buffer 310 for a certain amount of cycles while mesh shaders are outstanding in the shader processor 360, for example. Shader processor 360 may assert the blocked indication when a mesh shader is stalled due to waiting for a buffer allocation or sub-allocation, for example, or may aggregate wait times for multiple mesh shaders over a window. As will be understood by those skilled in the art, these signals may have various appropriate encodings and various triggers.

Further, rather than binary signals, these indications may specify an amount of blocking, a level of starvation, etc.

In some embodiments, feedback events may adjust an event counter (e.g., starvation may increase the counter and stalls may decrease the counter) and the threshold running total may be adjusted when the event counter meets certain thresholds. Further, total usage may be clamped to programmable high and low values (which may be a percentage of a size of a shared cache, for example).

Vertex control circuitry 385 may also receive an indication of whether a data cache at a certain level is spilling to a next-level cache or to memory. This indication may be associated with cache thrashing, which may reduce performance. In some embodiments, vertex control circuitry 385 is configured to reduce the threshold on the running total based on this indication, which may reduce or avoid thrashing at one or more cache levels, which in turn may improve performance and reduce power consumption.

Example Primitive Processing Pipeline

Figure 6:
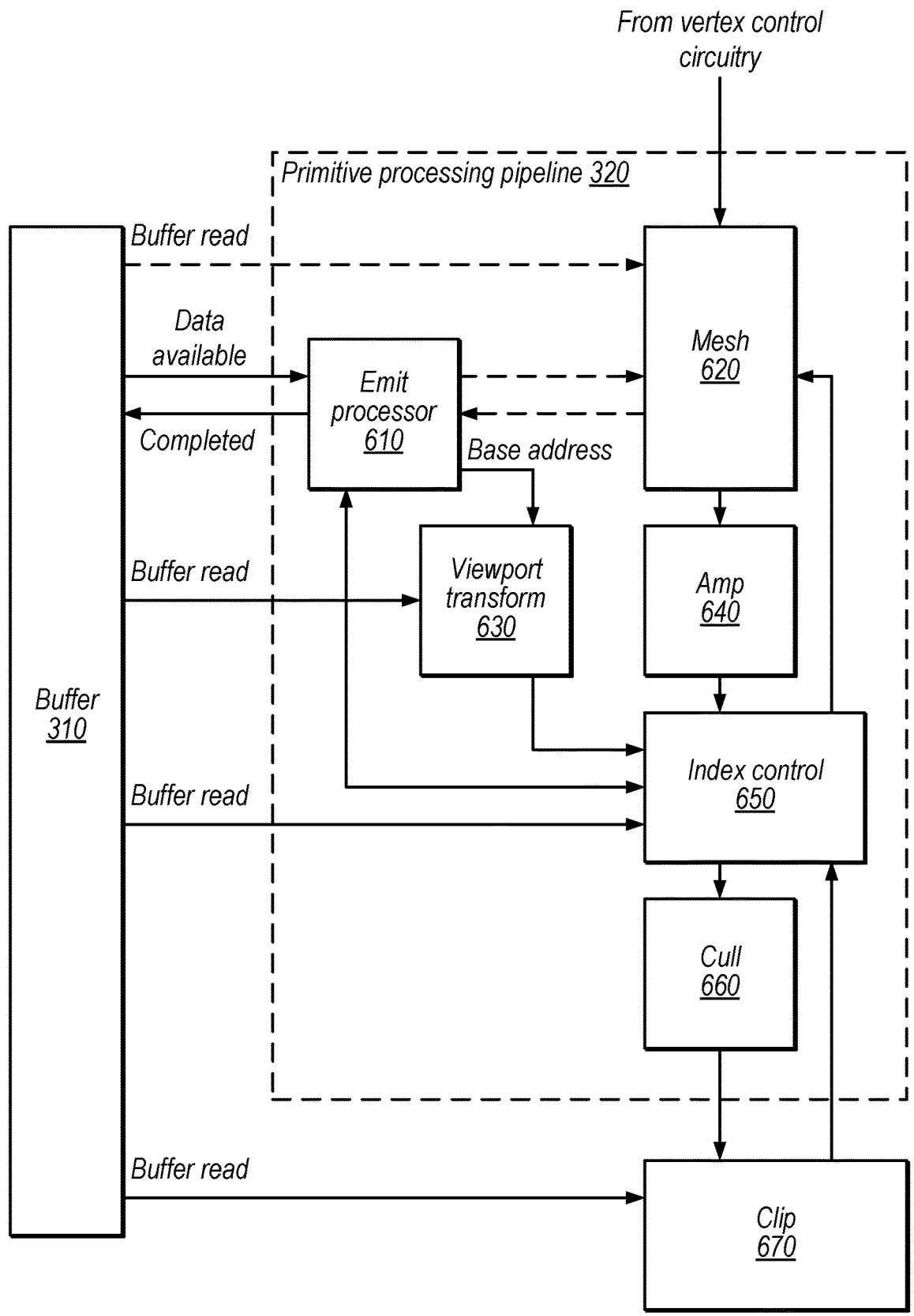
FIG. 6 is a block diagram illustrating an example primitive processing pipeline, according to some embodiments.

FIG. 6 is a block diagram illustrating an example primitive processing pipeline, according to some embodiments. In the illustrated embodiment, graphics unit 150 includes clip circuitry 670 and primitive processing pipeline circuitry 320 (which in turn includes emit processor 610, mesh circuitry 620, viewport transform circuitry 630, amplification (amp) circuitry 640, index control circuitry 650, and cull circuitry 660).

In some embodiments, primitive processing pipeline 320 is configured to viewport transform vertices from clip space to screen space, assemble vertices into primitives, perform primitive cull tests, export visible primitives to clip circuitry 670, and perform vertex amplification of vertices and primitives.

Emit processor 610, in the illustrated embodiment, is configured to receive and order vertex and state update task emits received from buffer 310 to be processed by viewport transform circuitry 630 and index control circuitry 650. As shown, emit processor 610 receives a "data available" signal when data is ready in buffer 310 (e.g., when a mesh shader is complete, among other types of data that may be stored in buffer 310). Emit processor 610 is configured to send meshlet data to mesh 620 for processing (e.g., to read and decode the meshlet format from buffer 310 such as the format of FIG. 9, discussed in detail below). Emit processor 610 also sends a "completed" signal when the primitive processing pipeline 320 is finished processing data in buffer 310, which may allow space for the data to be deallocated.

Mesh 620, in the illustrated embodiment, may receive meshlet transactions from vertex control circuitry as shown and wait for a corresponding emit from emit processor 610. Mesh 620 may provide processed meshlet primitive transactions to amplification circuitry 640. Mesh 620 may derive addresses and counts and read primitive indices to build meshlet primitives. For optional data, mesh 620 may attach the data to meshlet primitives if available. Mesh 620 may also derive addresses and initiate viewport transform for sets of vertices and may scoreboard sets of vertices, as discussed below with reference to FIG. 7.

Viewport transform 630, in some embodiments, is configured to receive a set of N vertices and perform viewport transform. Viewport transform 630 may store information such as the viewport ID into a flag word written to buffer 310 or scratch memory to be accessed by index control 650.

Amplification circuitry 640, in some embodiments, is configured to iterate primitives by amplification count and group up to a threshold number of primitives per amplification iteration. In some embodiments, amplification circuitry 640 may perform amplification for non-mesh operations while mesh 620 may perform amplification for meshlets.

Index control circuitry 650, in some embodiments, is configured to assemble vertices to a primitive by attaching buffer 310 address information to a vertex and reading vertex data values (such as position, point size, layer ID, viewport ID, and flag data) from buffer 310 to be passed to other circuitry. Index control circuitry 650 may determine when meshlets are complete (e.g., by reading scoreboard circuitry) and propagate mesh complete signals when appropriate.

Cull 660, in some embodiments, is configured to perform degenerate culling, offscreen culling, fully-clipped culling, back-face culling, small object culling, and perfect small object culling, or some combination thereof.

Clip circuitry 670, in some embodiments, is configured to disable rendering operations outside a clip region.

Example Viewport Transform Techniques

Viewport transform is a well-known technique in which two-dimensional world-coordinate objects are transformed by device coordinates (where the viewport is a portion of the frame/window/screen where world coordinates are mapped for display). As discussed above, mesh shaders may output streams of primitives to buffer 310 for processing by primitive processing pipeline 320, which may initiate viewport transformation. The vertex list derived from the primitive list for a meshlet may not match up with organization of buffer 310 (e.g., the buffer vertices may be organized sequentially, but the meshlet may not be). Therefore, it may be challenging to determine when groups of vertices are ready to launch viewport transform.

Figure 7:
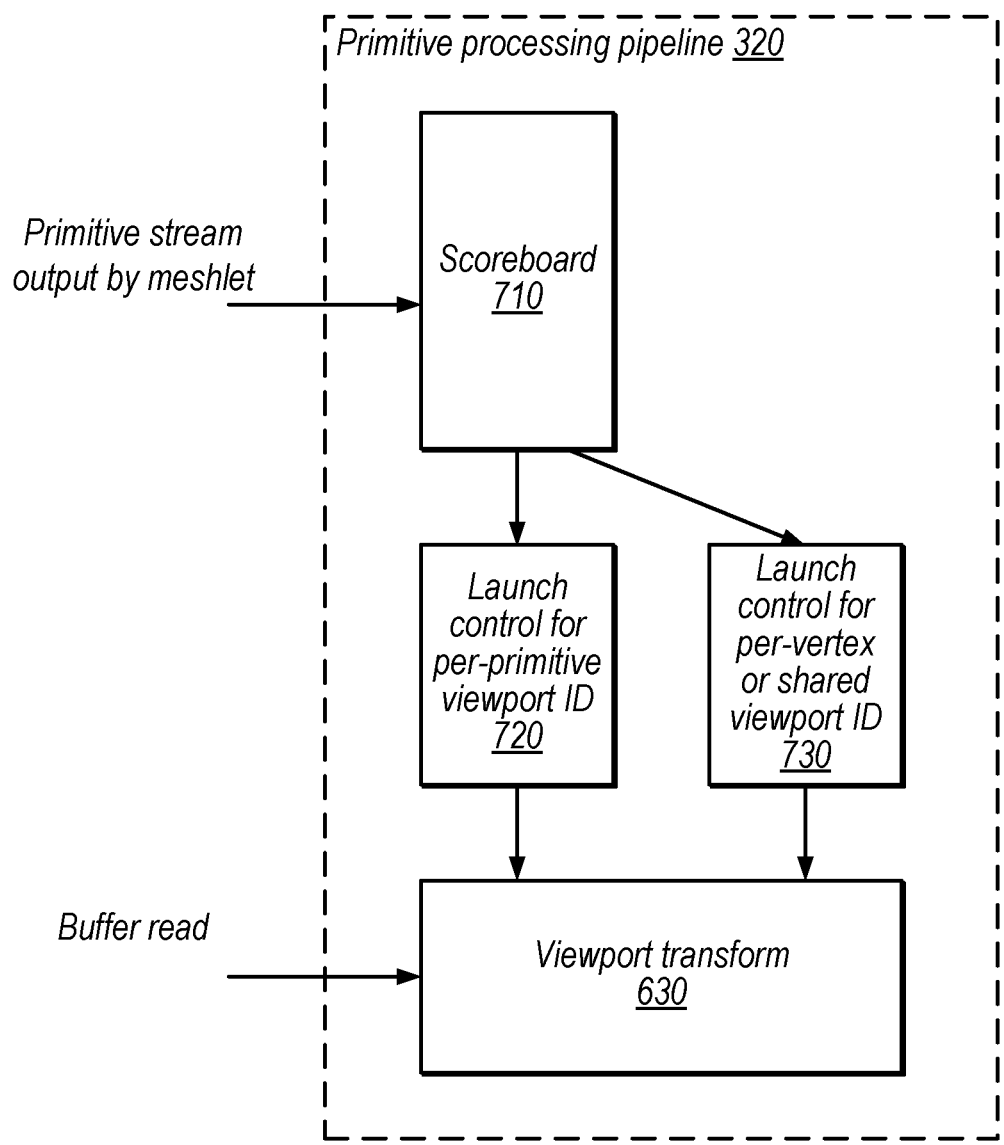
FIG. 7 is a block diagram illustrating example circuitry configured to initiate a viewport transformation, according to some embodiments.

FIG. 7 is a block diagram illustrating example circuitry configured to initiate a viewport transformation, according to some embodiments. In the illustrated embodiment, primitive processing pipeline 320 includes scoreboard circuitry 710, launch control 720 and 730, and viewport transform circuitry 630.

In some embodiments, scoreboard circuitry is configured to track vertex indices of incoming primitives output by a meshlet. Vertices may be grouped into groups of N for viewport transform. Viewport transform 630 may operate on N vertices at a time, e.g., in a packed format.

Viewport identifiers may be mapped differently in different modes of operation. For example, in one mode, each primitive may have a viewport ID. In another mode, the viewport ID may be per vertex or shared among a group of vertices (e.g., based on grouping in the buffer 310). In some embodiments, a given meshlet is configured to operate in one mode or the other.

For per-primitive viewport IDs, launch circuitry 720 is configured to wait to encounter all N vertices in a group in scoreboard 710 before launching the group on viewport transform circuitry 630.

For per vertex or shared primitive viewport IDs, launch circuitry 730 is configured to launch a group of N vertices as soon as one of the vertices in the group is encountered (e.g., based on knowledge that the remaining N−1 vertices will be stored adjacently in buffer 310 with per vertex or shared viewport IDs).

This may advantageously improve performance, e.g., by launching viewport transforms earlier when viewport IDs are per-vertex or shared.

Figure 8:
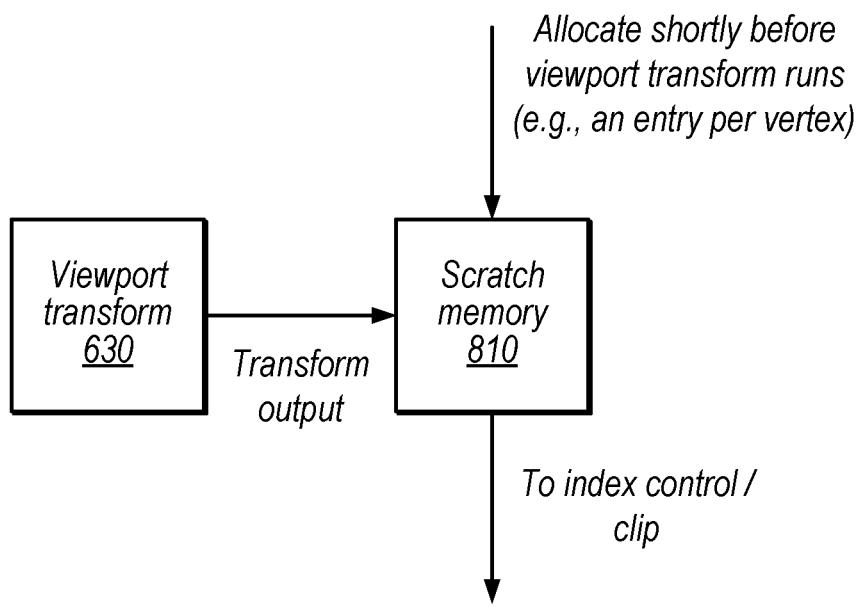
FIG. 8 is a block diagram illustrating example circuitry configured to implement a scratch memory for viewport transformation, according to some embodiments.

FIG. 8 is a block diagram illustrating example circuitry configured to implement a scratch memory for viewport transformation, according to some embodiments. In the illustrated embodiment, the graphics unit 150 includes scratch memory 810 which is configured to store output data from viewport transform 630 and send data to index control 650 and clip circuitry 670.

Including separate scratch memory circuitry for viewport results may have several advantages over implementations that store results in buffer 310 or global memory. For example, this may allow late allocation shortly before a viewport transform runs, e.g., allocating an entry per vertex. This may allow later, more efficient allocation than storing results in buffer 310, which might require allocation before vertex shader launch or during execution of a mesh shader as discussed above with reference to FIG. 3.

Each location in scratch memory 810 may store a number of data words, four position values, and flag information per vertex, for example. Index control 650 may read scratch memory 810 for primitive assembly, culling, and eventually clipping and fragment processing.

In some embodiments, scratch memory 810 physically resides in buffer 310 but uses separate memory banks or RAMs. Viewport transform 630 and index control 650 may communicate so that index control 650 knows when results are available in scratch memory 810.

Example Mesh Shader Output Data Structure

Figure 9:
FIG. 9 is a diagram illustrating an example mesh shader output data structure, according to some embodiments.

FIG. 9 is a diagram illustrating an example mesh shader output data structure, according to some embodiments. In the illustrated embodiment, mesh shader output 900 includes primitive indices (e.g., a triangle list, line list, point list, or some combination thereof), per primitive: viewport ID, layer ID, and primitive cull information, and per vertex: position (X, Y, Z, W in this example), linear/non-perspective correct (NPC)/flat information, point size, viewport and layer ID, and clip/cull distances. In some embodiments, the per-primitive data is optional.

These example fields are well understood to those in the art. Various disclosed information may be generated by user code in mesh shader programs and output to geometry and tiling processor circuitry (which may include primitive processing circuitry 320).

Various disclosed information may be floating-point values, integer values, or otherwise encoded. As discussed above, the primitive vertex indices may be organized differently in the mesh output than the format in buffer 310. A mesh shader may also output primitive attributes to fragment fixed-function circuitry configured to launch fragment shaders.

Example Methods

Figure 10:
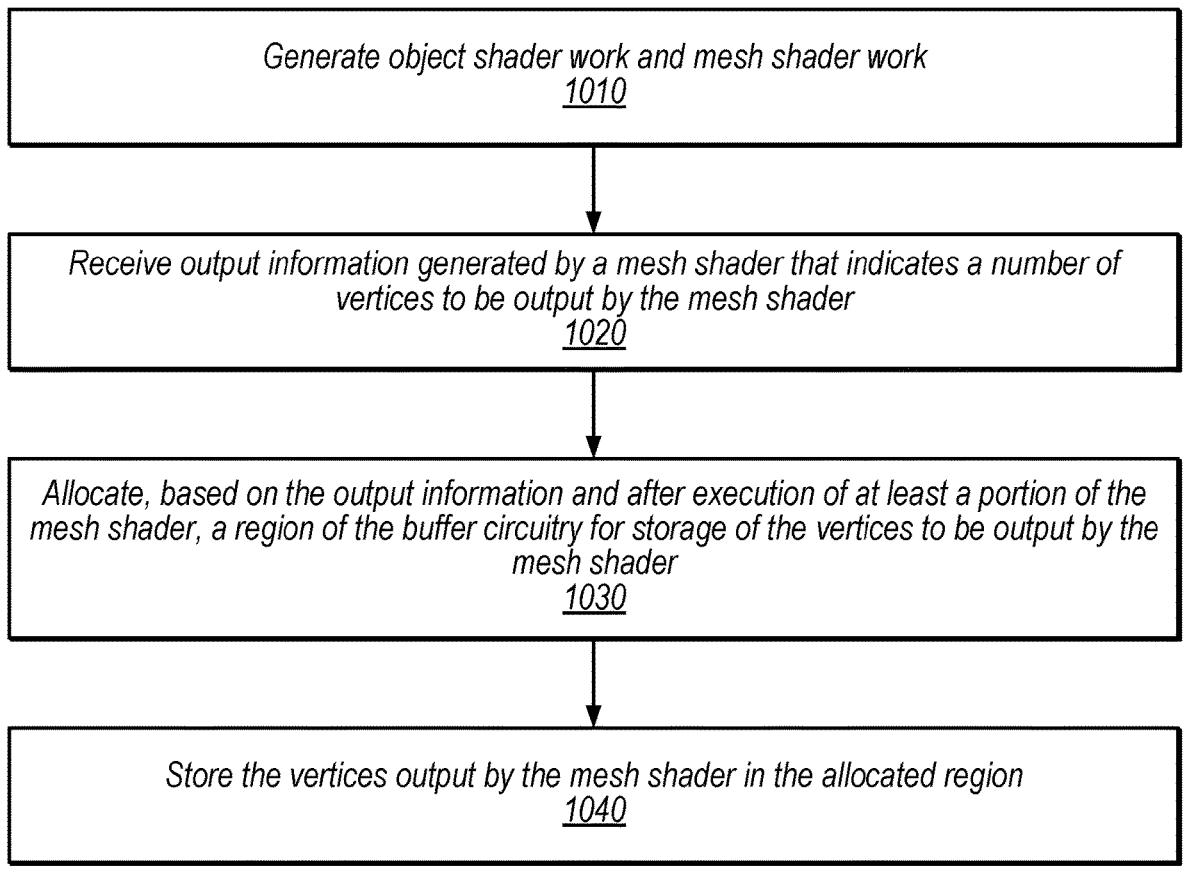
FIGS. 10 and 11 are flow diagrams illustrating example methods, according to some embodiments.

FIG. 10 is a flow diagram illustrating an example method for allocating buffer space for mesh shader output data, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a computing device generates object shader work and mesh shader work.

At 1020, in the illustrated embodiment, the computing device receives output information generated by a mesh shader that indicates a number of vertices to be output by the mesh shader. The output information may also indicate a number of primitives to be output by the mesh shader.

At 1030, in the illustrated embodiment, the computing device allocates, based on the output information and after execution of at least a portion of the mesh shader, a region of the buffer circuitry for storage of the vertices to be output by the mesh shader.

At 1040, in the illustrated embodiment, the computing device stores the vertices output by the mesh shader in the allocated region. Primitive processing circuitry may read data from buffer circuitry and process the data from the buffer circuitry for input to one or more fragment shaders. The processing may include viewport transformation and culling primitives that are not visible in a graphics frame.

In some embodiments, vertex control circuitry receives a buffer allocation request from the mesh shader that indicates output information having a first data size and allocates a partial allocation in the buffer circuitry that provides less than the first data size for the mesh shader. The vertex control circuitry sends a response that indicates the partial allocation to the mesh shader. The response may use a fence to indicate the partial allocation. Shader circuitry may stall the mesh shader while waiting for the fence to be cleared. Shader circuitry may support multiple fences mapped by the vertex control circuitry to different partial allocation sizes for the buffer circuitry. The vertex control circuitry may map a first fence to a first partial allocation size for the buffer circuitry for a requested buffer allocation of a first size and a second fence to a second partial allocation size for the buffer circuitry for a requested buffer allocation of a first size.

Figure 11:
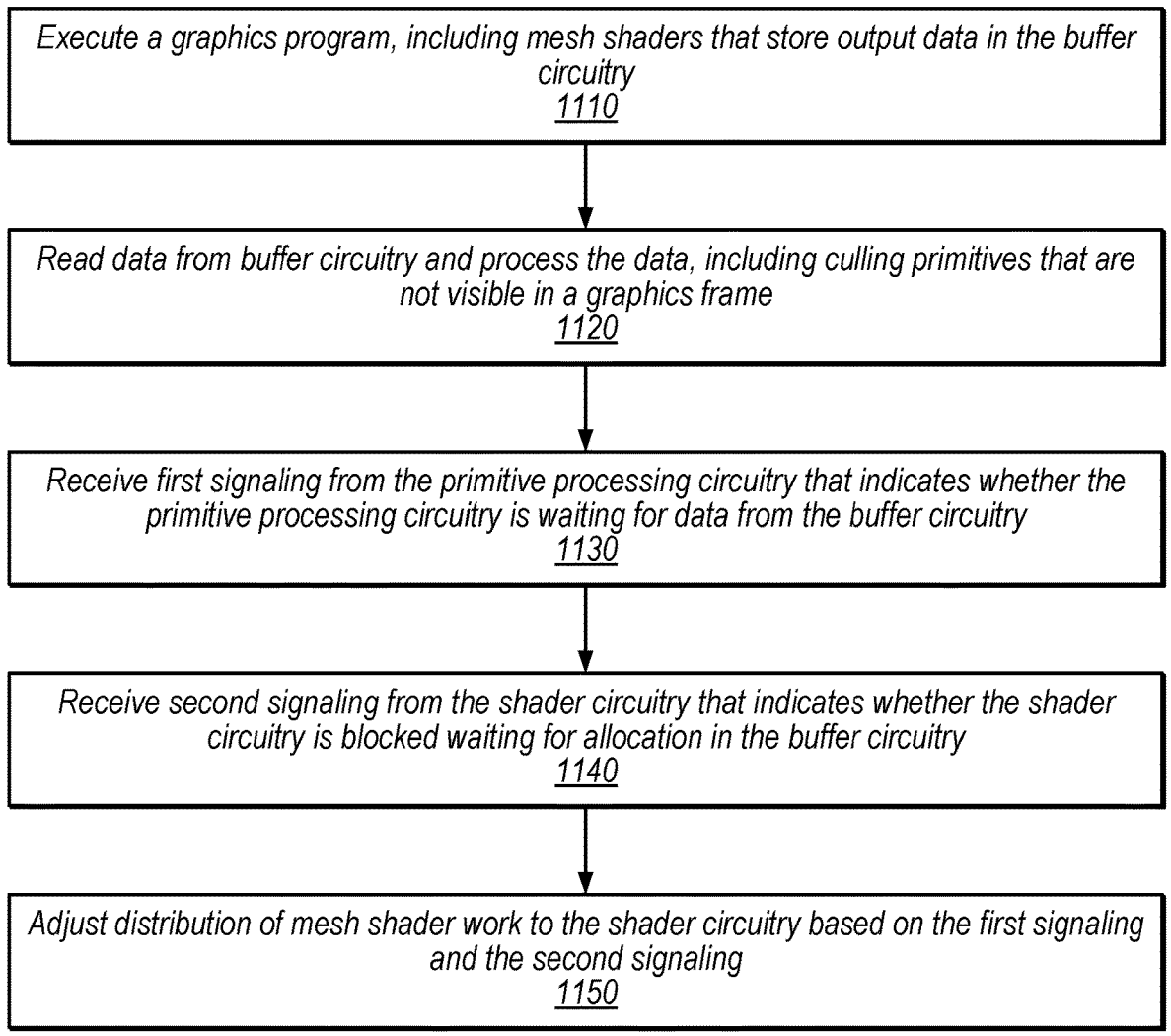

FIG. 11 is a flow diagram illustrating an example method for distributing mesh shader work, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, a computing device executes a graphics program, including mesh shaders that store output data in the buffer circuitry.

At 1120, in the illustrated embodiment, the computing device reads data from buffer circuitry and processes the data, including culling primitives that are not visible in a graphics frame.

At 1130, in the illustrated embodiment, the computing device receives first signaling from the primitive processing circuitry that indicates whether the primitive processing circuitry is waiting for data from the buffer circuitry.

At 1140, in the illustrated embodiment, the computing device receives second signaling from the shader circuitry that indicates whether the shader circuitry is blocked waiting for allocation in the buffer circuitry.

At 1150, in the illustrated embodiment, the computing device adjusts distribution of mesh shader work to the shader circuitry based on the first signaling and the second signaling. In some embodiments, the adjustment is also based on amounts of buffer space used by mesh shaders. The adjustment may include adjusting a limit on an amount of buffer space used by scheduled mesh shaders.

In some embodiments, the computing device also receives spill signaling based on evictions from a data cache and adjusts the distribution of shader work based on the spill signaling.

In some embodiments, the computing device performs a viewport transform on vertices stored by the shader circuitry in the buffer circuitry. The computing device may track incoming vertices of mesh primitives for multiple groups of vertices. The computing device may accumulate a full first group of vertices that utilize per-primitive viewport identifiers before initiating viewport transform for the first group of vertices and may initiate viewport transform of a second group of vertices in response to receiving one vertex in the second group of vertices, based on a determination that the group of vertices uses a per-vertex or shared a viewport identifier. The computing device may store viewport transform results in scratch memory circuitry that is implemented using one or more separate memory banks from the buffer circuitry. The computing device may allocate space for viewport transform results (e.g., an entry per vertex being transformed) in the scratch memory circuitry prior to running a viewport transform.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 12:
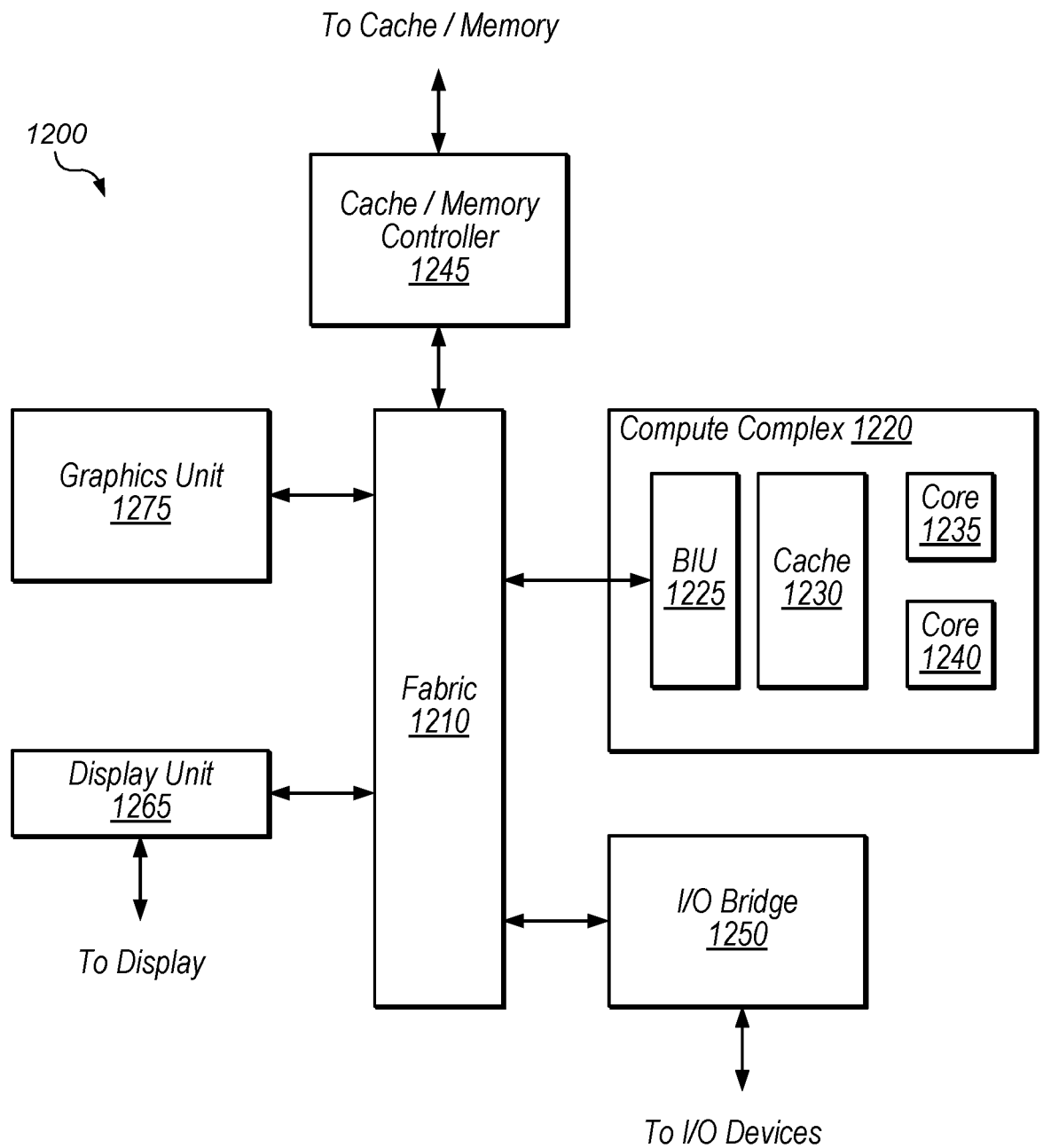
FIG. 12 is a block diagram illustrating an example computing device, according to some embodiments.

Referring now to FIG. 12, a block diagram illustrating an example embodiment of a device 1200 is shown. In some embodiments, elements of device 1200 may be included within a system on a chip. In some embodiments, device 1200 may be included in a mobile device, which may be battery-powered. Therefore, power consumption by device 1200 may be an important design consideration. In the illustrated embodiment, device 1200 includes fabric 1210, compute complex 1220 input/output (I/O) bridge 1250, cache/memory controller 1245, graphics unit 1275, and display unit 1265. In some embodiments, device 1200 may include other components (not shown) in addition to or in place of the illustrated components, such as video processor encoders and decoders, image processing or recognition elements, computer vision elements, etc.

Fabric 1210 may include various interconnects, buses, MUX's, controllers, etc., and may be configured to facilitate communication between various elements of device 1200. In some embodiments, portions of fabric 1210 may be configured to implement various different communication protocols. In other embodiments, fabric 1210 may implement a single communication protocol and elements coupled to fabric 1210 may convert from the single communication protocol to other communication protocols internally.

In the illustrated embodiment, compute complex 1220 includes bus interface unit (BIU) 1225, cache 1230, and cores 1235 and 1240. In various embodiments, compute complex 1220 may include various numbers of processors, processor cores and caches. For example, compute complex 1220 may include 1, 2, or 4 processor cores, or any other suitable number. In one embodiment, cache 1230 is a set associative L2 cache. In some embodiments, cores 1235 and 1240 may include internal instruction and data caches. In some embodiments, a coherency unit (not shown) in fabric 1210, cache 1230, or elsewhere in device 1200 may be configured to maintain coherency between various caches of device 1200. BIU 1225 may be configured to manage communication between compute complex 1220 and other elements of device 1200. Processor cores such as cores 1235 and 1240 may be configured to execute instructions of a particular instruction set architecture (ISA) which may include operating system instructions and user application instructions.

Cache/memory controller 1245 may be configured to manage transfer of data between fabric 1210 and one or more caches and memories. For example, cache/memory controller 1245 may be coupled to an L3 cache, which may in turn be coupled to a system memory. In other embodiments, cache/memory controller 1245 may be directly coupled to a memory. In some embodiments, cache/memory controller 1245 may include one or more internal caches.

As used herein, the term "coupled to" may indicate one or more connections between elements, and a coupling may include intervening elements. For example, in FIG. 12, graphics unit 1275 may be described as "coupled to" a memory through fabric 1210 and cache/memory controller 1245. In contrast, in the illustrated embodiment of FIG. 12, graphics unit 1275 is "directly coupled" to fabric 1210 because there are no intervening elements.

Graphics unit 1275 may include one or more processors, e.g., one or more graphics processing units (GPU's). Graphics unit 1275 may receive graphics-oriented instructions, such as OPENGL®, Metal, or DIRECT3D® instructions, for example. Graphics unit 1275 may execute specialized GPU instructions or perform other operations based on the received graphics-oriented instructions. Graphics unit 1275 may generally be configured to process large blocks of data in parallel and may build images in a frame buffer for output to a display, which may be included in the device or may be a separate device. Graphics unit 1275 may include transform, lighting, triangle, and rendering engines in one or more graphics processing pipelines. Graphics unit 1275 may output pixel information for display images. Graphics unit 1275, in various embodiments, may include programmable shader circuitry which may include highly parallel execution cores configured to execute graphics programs, which may include pixel tasks, vertex tasks, and compute tasks (which may or may not be graphics-related).

Graphics unit 1275 may utilize various disclosed techniques to efficiently allocate buffer space, distribute mesh shaders, initiate viewport transformations, etc.

Display unit 1265 may be configured to read data from a frame buffer and provide a stream of pixel values for display. Display unit 1265 may be configured as a display pipeline in some embodiments. Additionally, display unit 1265 may be configured to blend multiple frames to produce an output frame. Further, display unit 1265 may include one or more interfaces (e.g., MIPI® or embedded display port (eDP)) for coupling to a user display (e.g., a touchscreen or an external display).

I/O bridge 1250 may include various elements configured to implement: universal serial bus (USB) communications, security, audio, and low-power always-on functionality, for example. I/O bridge 1250 may also include interfaces such as pulse-width modulation (PWM), general-purpose input/output (GPIO), serial peripheral interface (SPI), and inter-integrated circuit (I2C), for example. Various types of peripherals and devices may be coupled to device 1200 via I/O bridge 1250.

In some embodiments, device 1200 includes network interface circuitry (not explicitly shown), which may be connected to fabric 1210 or I/O bridge 1250. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1200 with connectivity to various types of other devices and networks.

Example Applications

Figure 13:
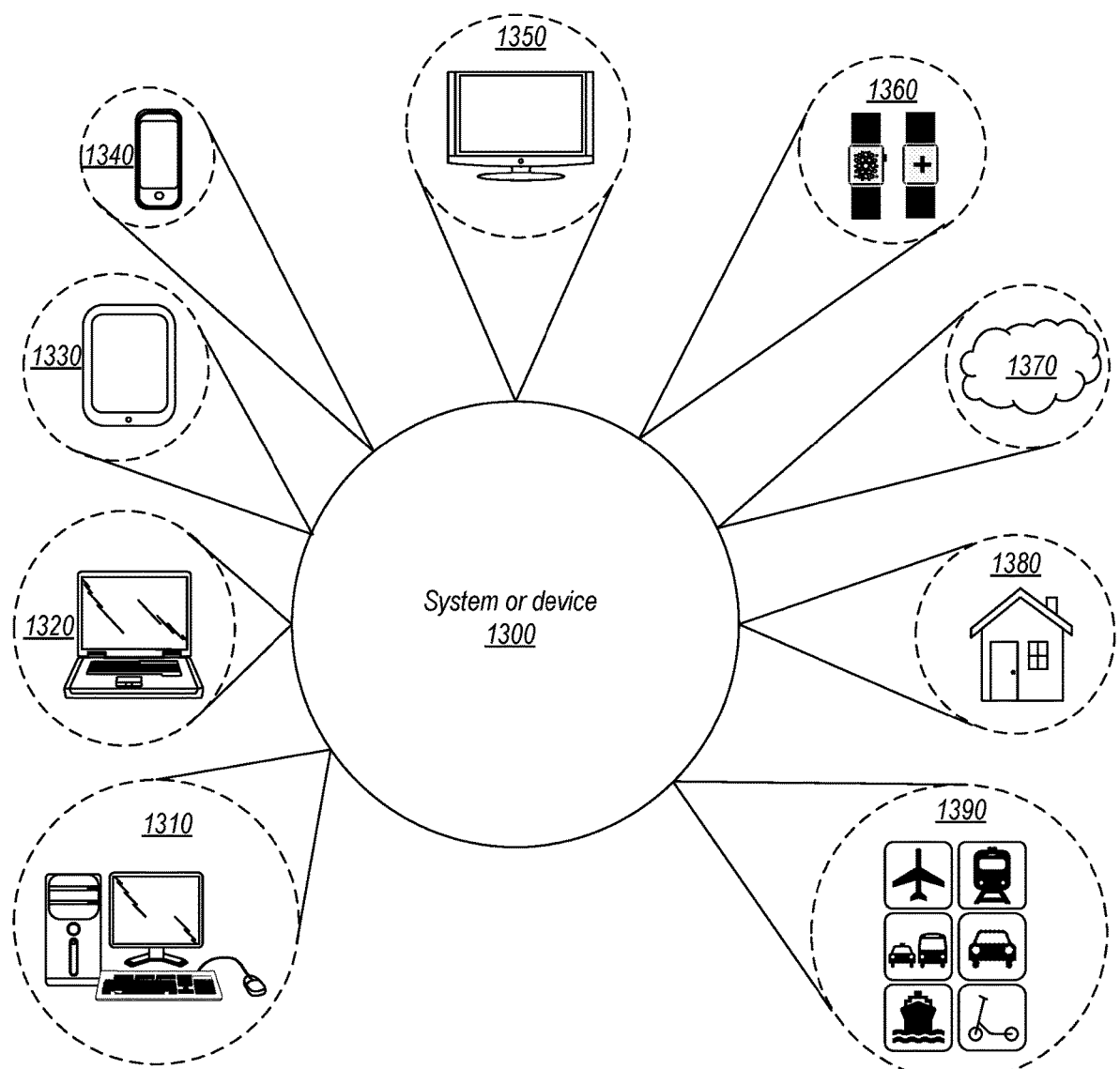
FIG. 13 is a diagram illustrating example applications of disclosed systems and devices, according to some embodiments.

Turning now to FIG. 13, various types of systems that may include any of the circuits, devices, or system discussed above. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 14:
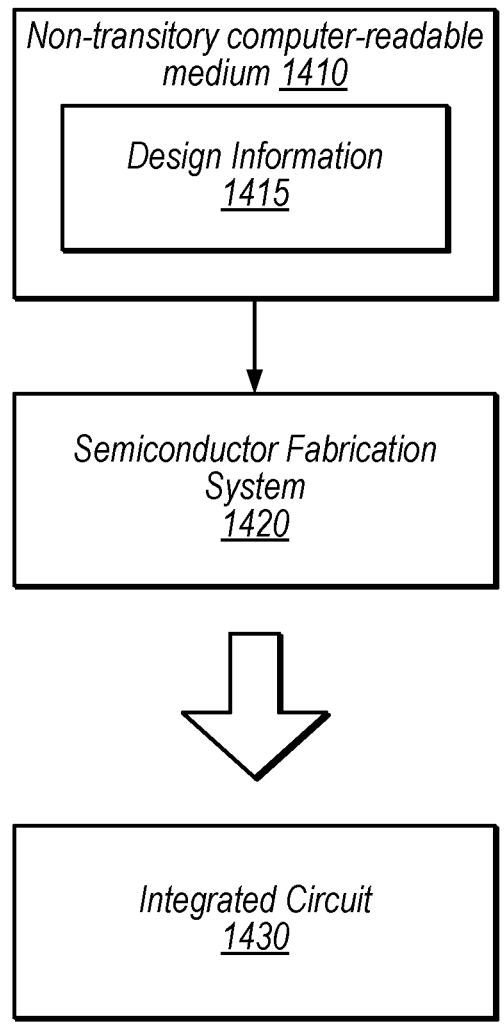
FIG. 14 is a block diagram illustrating an example computer-readable medium that stores circuit design information, according to some embodiments.

FIG. 14 is a block diagram illustrating an example non-transitory computer-readable storage medium that stores circuit design information, according to some embodiments. In the illustrated embodiment semiconductor fabrication system 1420 is configured to process the design information 1415 stored on non-transitory computer-readable medium 1410 and fabricate integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system 1420. In some embodiments, design information 1415 may also include one or more cell libraries which specify the synthesis, layout, or both of integrated circuit 1430. In some embodiments, the design information is specified in whole or in part in the form of a netlist that specifies cell library elements and their connectivity. Design information 1415, taken alone, may or may not include sufficient information for fabrication of a corresponding integrated circuit. For example, design information 1415 may specify the circuit elements to be fabricated but not their physical layout. In this case, design information 1415 may need to be combined with layout information to actually fabricate the specified circuitry.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown in FIGS. 1B, 3-8, and 12. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    buffer circuitry;
    shader circuitry configured to execute graphics programs;
    control circuitry configured to:
        generate object shader work and mesh shader work for the shader circuitry;
        receive output information generated by a mesh shader that indicates a number of vertices to be output by the mesh shader;
        allocate, based on the output information and after execution of at least a portion of the mesh shader, a region of the buffer circuitry for storage of the vertices to be output by the mesh shader, wherein the allocation is a partial allocation that does not provide storage space for all of the number of vertices to be output by the mesh shader;
        provide an indication of a size of the partial allocation to the shader circuitry; and
        store a portion of the vertices output by the mesh shader in the partial allocation region, prior to allocation of sufficient storage space for all vertices of the number of vertices; and
    wherein the shader circuitry is configured to stall the mesh shader after providing the portion of the vertices, while waiting for allocation of additional storage space.

2. The apparatus of claim 1, wherein a fence indicates the partial allocation.

3. The apparatus of claim 2, wherein the shader circuitry supports multiple fences mapped by the control circuitry to different partial allocation sizes for the buffer circuitry.

4. The apparatus of claim 3, wherein the control circuitry is configured to map:
    a first fence to a first partial allocation size for the buffer circuitry for a requested buffer allocation of a first size; and
    a second fence to a second partial allocation size for the buffer circuitry for a requested buffer allocation of a first size.

5. The apparatus of claim 1, wherein the output information also indicates a number of primitives to be output by the mesh shader.

6. The apparatus of claim 1, further comprising:
    primitive processing circuitry configured to read data from buffer circuitry and process the data from the buffer circuitry for input to one or more fragment shaders, including to perform viewport transformation and to cull primitives that are not visible in a graphics frame.

7. The apparatus of claim 1, wherein the apparatus is a computing device that further includes:
    a central processing unit;
    a display; and
    network interface circuitry.

8. A method, comprising:

a computing device:

generating object shader work and mesh shader work;

receiving output information generated by a mesh shader that indicates a number of vertices to be output by the mesh shader;

allocating, based on the output information and after execution of at least a portion of the mesh shader, a region of buffer circuitry for storage of the vertices to be output by the mesh shader, wherein the allocation is a partial allocation that does not provide storage space for all of the number of vertices to be output by the mesh shader;

providing an indication of a size of the partial allocation;

storing a portion of the vertices output by the mesh shader in the partial allocation region, prior to allocation of sufficient storage space for all vertices of the number of vertices; and stalling the mesh shader after providing the portion of the vertices, while waiting for allocation of additional storage space.

9. The method of claim 8, wherein a fence indicates the partial allocation.

10. The method of claim 9, further comprising the computing device:

utilizing multiple different fences to indicate multiple different partial allocation sizes for the buffer circuitry.

11. The method of claim 10, further comprising the computing device:

utilizing a first fence to indicate a first partial allocation size for the buffer circuitry for a requested buffer allocation of a first size; and utilizing the first fence to indicate a second partial allocation size for the buffer circuitry for a requested buffer allocation of a second size.

12. The method of claim 8, further comprising:

processing, using one or more fragment shaders, the stored vertices.

13. The method of claim 8, wherein the output information also indicates a number of primitives to be output by the mesh shader.

14. The method of claim 8, further comprising the computing device:

reading data from buffer circuitry and processing the data from the buffer circuitry for input to one or more fragment shaders, including performing viewport transformation and culling primitives that are not visible in a graphics frame.

15. A non-transitory computer-readable medium having instructions for a mesh shader stored thereon that are executable by a computing device to perform operations comprising:

generating output information that indicates, prior to completion of the mesh shader, a number of vertices to be output by the mesh shader;

receiving, after execution of at least a portion of the mesh shader, an indication of a buffer allocation for at least a portion of the number of vertices, wherein the allocation is a partial allocation that does not provide storage space for all of the number of vertices to be output by the mesh shader; and storing a portion of vertex information to the allocated buffer, prior to allocation of sufficient storage space for all vertices of the number of vertices;

wherein the execution is stalled after providing the portion of the vertices, while waiting for allocation of additional storage space.

16. The non-transitory computer-readable medium of claim 15, wherein the operations further comprise:

requesting the buffer allocation.

17. The non-transitory computer-readable medium of claim 15, wherein the operations further comprise detecting the partial allocation based on clearing of a fence.

* * * * *